Patented Apr. 8, 1941

2,237,311

UNITED STATES PATENT OFFICE 2,237,311

PREPARATION OF CADMIUM PIGMENTS

James J. O'Brien, Baltimore, Md., assignor to The Glidden Company, Cleveland, Ohio, a corporation of Ohio No Drawing. Application November 21, 1938, Serial No. 241,633

12 Claims. (Cl. 134—58)

The present invention relates to the production of cadmium sulfide pigments and more particularly relates to the production of the so-called pure cadmium colors. In the ordinary commercial production of cadmium pigments such as the cadmium reds and yellows the pigment is ordinarily a co-precipitated material of the lithopone type, in which a white salt such as barium sulfate is used. This reaction is obtained by precipitating the soluble cadmium salt solution such as cadmium sulfate with barium sulfide, to precipitate a cadmium sulfide and barium sulfate.

Attempts to precipitate the pure cadmium sulfide or sulfo-selenide to produce the so-called pure cadmium colors have not produced satisfactory results. For example, various experiments carried out to produce pure reds by mixing cadmium carbonate, with sulfur, selenium and aluminum hydrate gave very poor results, probably due to the formation of cadmium oxide during the calcination, causing muddy colors. Other attempts to make the pure colors, by reacting cadmium sulfate with sodium sulfide and calcining, gave only slightly better results, due probably to the presence of free sulfur, sulfur compounds or occluded sodium sulfate salts which caused hard crystal formations.

The prior art also mentions that, in place of barium sulfide, sodium sulfide may be used to react with the cadmium sulfate in the production of both the cadmium sulfide yellows and the cadmium sulfo-selenide reds. When using sodium sulfide as the precipitant, soluble sodium sulfate is, of course, formed, and the precipitate is, of course, essentially the pure cadmium sulfide or sulfo-selenide.

According to the present invention a process is provided whereby pure cadmium colors are produced without the objectionable features of the processes for making pure colors above mentioned. The pure colors produced in accordance with the present invention are brighter and cleaner than the corresponding lithopone colors, have considerably higher tinting strength, are of soft texture, and good opacity, and mix well in linseed oil and other vehicles.

It has been found, however, that a better pigment results when barium sulfide is used with a cadmium salt which results in the formation of a soluble barium salt, than when a soluble sulfate is formed. Preferably the cadmium salt used is cadmium nitrate. While it is not desired to be bound by any theory, it is believed that any barium nitrate remaining in the precipitate after filtering and washing is decomposed during the calcination of the pigment, with the incidental production of a condition wherein the cadmium sulfide pigment is not oxidized. Due to this decomposition of the nitrate, the problem presented by occluded salts is minimized. It is believed that the decomposition of the nitrate may be represented as follows, the $SO_2$ being formed during the calcination:

(1) $Ba(NO_3)_2 \rightarrow BaO + N_2O_5$
(2) $BaO + N_2O_5 + SO_2 = BaSO_4 + 2NO_2$ The small amount of $BaSO_4$ does not noticeably affect the pigment, which is considered a pure color. The $NO_2$ formed acts to produce non-oxidizing condition in the calcination zone with beneficial results to the pigment.

Accordingly, in a preferred form of the invention a barium sulfide solution is struck with a cadmium nitrate solution, the reaction being represented as follows:

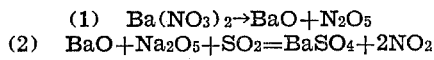
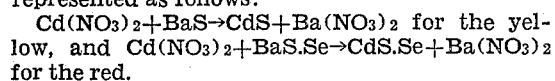

for the red.

The strike may be made by either adding the barium sulfide to the cadmium nitrate, by adding the cadmium nitrate to the barium sulfide or by adding the two simultaneously. The pH for the precipitation should preferably be between 7 and 8.8.

The precipitate of cadmium sulfide yellow is separated from the solution of barium nitrate and calcined. In the case of the cadmium sulfo-selenide reds, it is not necessary that the precipitate be washed, while for the pure cadmium sulfide yellows, it is preferable to wash the precipitate before calcining. When considerable amounts of barium nitrate are present during the calcination, a slight residue of barium sulfate is noted, which in the case of the reds appears immaterial. In the case of the yellows, somewhat better results are obtained if the precipitate is washed before calcination. The calcination is preferably carried out at temperatures of approximately 500° to 700° C., more or less.

The barium nitrate solution obtained from the reaction may be reacted with cadmium sulfate to produce a precipitate of barium sulfate, which may be used as a pigment, and a cadmium nitrate solution, which is reacted with a new batch of barium sulfide.

Examples I and II represent, respectively, the production of the pure cadmium reds and the pure cadmium yellows in accordance with the present invention.

Example I

Cadmium nitrate was prepared by digesting cadmium metal with nitric acid to produce a cadmium nitrate solution of 36° Baumé at 68° F. and neutral to methyl orange. 30 grams of selenium was dissolved in 1220 cc. of a barium sulfide solution of 16.5° Baumé at 140° F. to form a barium sulfo-selenide solution. To this barium sulfo-selenide solution was added 500 cc. of the cadmium nitrate solution. The precipitate was agitated and heated to 180° F. and the pH adjusted to 8.8. The precipitate was filtered, dried and calcined without washing. The calcination was carried out at temperatures from 500° C. to 700° C., the occluded barium nitrate being decomposed at these temperatures. The calcined pigment quenched in water produced a pure cadmium sulfo selenide red pigment.

The pigment when compared with lithopone red of the same shade had a cleaner and brighter color and the tinting strength was 190% as compared to the lithopone red based at 100%. The texture of the pure red was soft, the pigment had good opacity and mixed well in linseed oil.

The various shades of reds may be produced by varying the amount of selenium dissolved in the barium sulfide solution, the darker shades containing more selenium than the lighter ones.

Example II 500 cc. of a cadmium nitrate solution of 35.3° Baumé at 75° F. containing 207.3 grams of $Cd(NO_3)_2$ was reacted with 1000 cc. of a barium sulfide solution of 17.8° Baumé at 126 F. containing 206.5 grams of BaS. The precipitate was heated to 180° F. and the pH adjusted to 8.8.

The filtered and dried but unwashed precipitate was calcined at approximately 500-700° C. The tinting strength was stronger by about 90% than the corresponding cadmium lithopone yellow, and was of a clear bright color.

The use of cadmium nitrate and barium sulfide permits of the production of all shades of the yellow pigment from the lemon shades to the orange. The different colors in the medium and golden shades are obtained by a control of the temperature of calcination approximately in the range of 500° C. to 700° C. The best lemon shades are obtained by using from 4 to 8% zinc metal with from 92 to 96% cadmium metal to form a mixture of cadmium and zinc nitrates, which when reacted with the barium sulfide and calcined gives the various lemon shades. The orange shade is a direct product of the precipitation being the washed and dried but uncalcined precipitate.

It is thus seen that the present process permits of the production of all shades of the pure cadmium colors which are cleaner and brighter than the corresponding cadmium lithopone colors and have a considerably increased tinting strength over the lithopone type pigments.

Examples III and IV illustrate the production of pigments according to the present invention in commercial quantities.

Example III 102 gals. of cadmium nitrate solution containing 260 lbs. of cadmium nitrate was reacted with 140 gals. of a barium sulfide solution containing 239.5 lbs. of barium sulfide. The precipitate was heated to 180° F. The pH of the precipitate was 8.6. The precipitate was filtered, washed and dried, but not calcined to give an orange cadmium sulfide pigment having a clean bright color.

Example IV 13 gals. of cadmium nitrate solution containing 43½ lbs. of cadmium nitrate was reacted with 28 gals. of a barium sulfo-selenide solution containing 41.58 lbs. of barium sulfide and 7.5 lbs. of dissolved selenium, and the precipitate was heated to 180° F. The precipitate had a pH of 8.0. The precipitate was filtered and calcined without washing at a temperature of 500 to 700° C. to give a pure red cadmium sulfoselenide pigment having a clear bright color. The filtrate containing the barium nitrate was then treated with a cadmium sulfate solution containing 38 lbs. of cadmium sulfate. The precipitate of barium sulfate was filtered and the filtrate of cadmium nitrate used in the production of another batch of cadmium pigment.

It is to be understood that the above examples are illustrative only. Various changes and modifications may be made without departing from the spirit of the invention. Other water soluble sulfides such as sodium sulfide may be used in place of barium sulfide, although the latter appears to give the best results. Other methods than filtration may be employed for recovering the precipitate, if desired.

Having described the invention, what I claim and desire to secure by Letters Patent of the United States is:

1. The process of preparing cadmium sulfide pigments which comprises reacting cadmium nitrate and a barium sulfide in aqueous solution and adjusting the pH of the precipitate to between 7 and 8.8.

2. The process of preparing cadmium sulfide pigments comprising reacting cadmium nitrate and a barium sulfide in aqueous solution, adjusting the precipitate to a pH between 7 and 8.8, recovering the precipitate and calcining the recovered precipitate at temperatures approximately between 500° and 700° C.

3. The process of preparing cadmium sulfide pigments comprising reacting cadmium nitrate and a barium sulfide in aqueous solution, adjusting the pH of the precipitate to between 7 and 8.8, filtering the precipitate and calcining the unwashed precipitate at temperatures approximately between 500° and 700° C.

4. The process of preparing cadmium sulfoselenide red pigments comprising reacting an aqueous solution of barium sulfide containing dissolved selenium with cadmium nitrate adjusting the pH of the precipitate to between 7 and 8.8, filtering and calcining the unwashed precipitate at temperatures approximately between 500° and 700° C.

5. The process of preparing a yellow cadmium sulfide pigment comprising reacting cadmium nitrate and barium sulfide in aqueous solution, adjusting the precipitate to a pH between 7 and 8.8, filtering the precipitate, washing to reduce the amount of barium nitrate solution in the precipitate and calcining the washed precipitate at temperatures between approximately 500° and 700° C.

6. The process of preparing an orange cadmium sulfide pigment comprising reacting cadmium nitrate and barium sulfide in aqueous solution, adjusting the precipitate to a pH of between 7 and 8.8, filtering, washing, and drying the precipitate without calcination to produce an orange cadmium sulfide pigment.

7. In the process of preparing a cadmium sulfide pigment the step which comprises calcining a fresh precipitate comprising cadmium sulfide having barium nitrate admixed therewith at approximately 500–700° C.

8. The process of preparing cadmium sulfide pigments comprising reacting a water soluble sulfide and cadmium nitrate in aqueous solution, recovering the precipitate and calcining the recovered precipitate.

9. The process of preparing cadmium sulfide pigments comprising reacting a water soluble sulfide and cadmium nitrate in aqueous solution, adjusting the pH of the precipitate to between 7 and 8.8, filtering the precipitate and calcining the filtered precipitate at a temperature between approximately 500° C. and 700° C.

10. A cyclic process for preparing pigments comprising reacting a solution containing cadmium nitrate solution with a barium sulfide solution to form a precipitate containing cadmium sulfide and barium nitrate in solution, separating the barium nitrate solution from the cadmium sulfide precipitate, calcining the cadmium sulfide containing precipitate, reacting the barium nitrate solution with a cadmium sulfate solution to form a pigmentary barium sulfate and a cadmium nitrate solution, separating the pigmentary barium sulfate from the cadmium nitrate solution and re-using the cadmium nitrate solution thus formed in the process.

11. A cyclic process for preparing pigments comprising reacting a cadmium nitrate solution with barium sulfide to form a precipitate of cadmium sulfide and a solution of barium nitrate, separating the cadmium sulfide from the barium nitrate solution, calcining the cadmium sulfide, reacting the barium nitrate solution with a cadmium sulfate solution to form pigmentary barium sulfate and a cadmium nitrate solution, separating the pigmentary barium sulfate from the cadmium nitrate, and re-using the thus formed cadmium nitrate solution in the process.

12. A cyclic process for preparing pigments comprising reacting a cadmium nitrate solution with a barium sulfide solution containing dissolved selenium to form a precipitate of cadmium sulfo-selenide and a solution of barium nitrate, separating the precipitate of cadmium sulfo-selenide from the barium nitrate solution, calcining the cadmium sulfo-selenide precipitate, reacting the barium nitrate solution with a cadmium sulfate solution to form a precipitate of pigmentary barium sulfate and a solution of cadmium nitrate, and re-using the thus formed cadmium nitrate solution in the process.

JAMES J. O'BRIEN.